United States Patent [19]

Obrecht

[11] Patent Number: 4,484,067
[45] Date of Patent: Nov. 20, 1984

[54] CARD IDENTIFICATION SYSTEM

[76] Inventor: Werner Obrecht, Rosenstrasse 7, Wielenbach, Fed. Rep. of Germany, D-8121

[21] Appl. No.: 309,785

[22] Filed: Oct. 8, 1981

[30] Foreign Application Priority Data

Oct. 31, 1980 [DE] Fed. Rep. of Germany ....... 3041109

[51] Int. Cl.³ .............................................. G06K 5/00
[52] U.S. Cl. .................................... 235/380; 235/381; 235/382; 235/379
[58] Field of Search ................ 235/379, 380, 381, 382, 235/419; 340/825.31, 825.32, 825.33, 825.34, 825.35

[56] References Cited

U.S. PATENT DOCUMENTS

| | | | |
|---|---|---|---|
| 3,906,460 | 9/1975 | Halpern | 235/419 X |
| 3,953,769 | 4/1976 | Sopko | 340/825.31 |
| 4,001,610 | 1/1977 | Griffin | 307/594 |
| 4,053,790 | 10/1977 | Myers | 307/594 |
| 4,092,524 | 5/1978 | Moreno | 235/419 |
| 4,158,874 | 6/1979 | Ellsberg | 340/825.31 |
| 4,236,068 | 11/1980 | Walton | 235/380 |
| 4,322,719 | 3/1982 | Moorhouse | 235/382 |
| 4,323,799 | 4/1982 | King | 307/594 |
| 4,341,951 | 7/1982 | Benton | 235/381 |

FOREIGN PATENT DOCUMENTS 1329964 12/1973 United Kingdom .
1563568 3/1980 United Kingdom .

*Primary Examiner*—Harold I. Pitts
*Attorney, Agent, or Firm*—Fleit, Jacobson, Cohn & Price

[57] ABSTRACT

An identification element in the form of an integrated circuit, for example for identification cards and similar data carriers. The element contains a confidential code which is known only by the lawful owner of the card and is compared in the integrated circuit with a typed in code.

To prevent the unauthorized use of the card, an independent circuit (1), which is isolated from the rest of the circuit, is provided in the element to detect incorrect code inputs and then render the card inoperable for a certain period of time. The off-period can be set as a function of the possible code permutations in such a way that it is practically impossible for the fraud to find out the correct code within the normal period of validity of the card.

The circuit (2) can also be used to maintain the operability of the card for a predetermined period of time when the correct code has been typed in and without any further inputs. Thus the lawful owner has the possibility of typing in his code undisturbed by other persons before the actual use of the card.

14 Claims, 6 Drawing Figures

CARD IDENTIFICATION SYSTEM

SUMMARY OF THE INVENTION

The invention concerns an identification element, in particular for identification cards and similar data carriers, containing in addition to general data an identification code which is compared with a code that is e.g. manually fed in to provide yes-or-no information for every use of the data carrier.

Identification elements of the above-mentioned type are incorporated in the form of integrated circuits into identification cards and similar data carriers, which have increasingly come into use recently in automatic monetary and service transactions. In order that only the owner of the identification card be able to use it, the identification element contains a confidential code known only to him having, for example, the form of a four-digit number, which is compared with a number fed in through a suitable terminal by the user for every use of the card. The identification card can only be actually used, for example to withdraw money from an account, when the character strings of both numbers are identical.

If a card provided with this type of identification element is stolen or lost, a fraud familiar with the material basically has the possibility of ascertaining the confidential code by trying out all the code possibilities in a short time by aid of a suitable program and according to high cycle frequencies, and evaluating the reaction of the identification card to the correct code. The fraud profits from the fact that the code usually consists of only a few characters, as it should be easy to memorize for the user.

For this reason it has already been proposed that the above-mentioned possibility of fraudulence be ruled out by a so-called error counter (see U.S. Pat. No. 3,906,460 and DE-OS No. 26 21 271). The error counter registers every code that is incorrectly fed in and prevents communication and/or destroys the arrangement as soon as a predetermined number of errors is reached. In comparison with the number of code possibilities the number of permissible errors is set in this connection so low that the fraud has practically no chance of finding the right code, while on the other hand the lawful owner is allowed to commit a few errors inadvertently during the entire useful life of the card. The errors must be stored in such a way that each value is retained even in a currentless state and cannot be manipulated. According to the DE-OS No. 26 21 271 so-called non-volatile memories are therefore proposed as error counters, whereby the safest form of irreversible storage is possible by aid of so-called PROMs, for which appropriate strip conductors are burned through during programming.

The non-volatile memories known up to now, however, have the characteristic that during the storage process, which, as mentioned, comes about for example by burning through strip conductors, increased power consumption necessarily arises over a period of a few milliseconds, which allows for new possibilities of manipulating this type of identification element. By observing the current consumption of the identification element a fraud could prevent the storage process when a higher value is registered, by switching off the current supply. It has thus already been proposed in the scope of the DE-OS No. 26 21 271 that a simulation circuit be provided which simulates increased current consumption whenever the code is tested. If an incorrect code is detected, an appropriate logic switches off the simulation circuit and initiates the storage process with practically constant current consumption.

However, it has turned out that in the realization of this type of protective device the error counters and all the auxiliary attachments necessarily connected with them require considerable circuit complexity, which especially conflicts with the attempt to keep the arrangement and/or the semiconductor wafers for the above-mentioned arrangement as small as possible. Furthermore, the error counter may strongly restrict the intended period of validity of the identification card, because incorrect inputs are inevitable even in legitimate use. This is even more so when the user makes use of a muchfrequented money-issuing automaton and must operate it in a hurry and possibly observed by other persons.

The problem of the invention in question thus consists in creating an identification element of the type mentioned which prevents the possibilities of fraudulence mentioned with considerably less circuit complexity and which allows for pleasant use by the owner of the identification card.

The problem is solved according to the invention by having the identification element contain at least one activated timer by which communication with the element can be influenced for a predetermined period of time following a code input.

The basic idea of the invention is that a time-dependent element isolated from the rest of the circuit of the identification element (timer) should be provided, with which the identification element is rendered functionless for a certain period of time after an incorrect input, for example by blocking the data input line. However it is also possible to use a timer in addition to or independently of the first-named function which allows for the use of the identification element for a certain time after one code input without any further code input.

When the timer is used as a blocking element it is unimportant for its functioning whether the identification element is separated from the current source after the detection of an incorrect input or not. The timer is however in any case constructed inside the identification element and electronically isolated in such a way that the blocking function can neither be delayed nor changed by external means. Another code input and thus further communication are only possible when the data input lines are opened again after the off-period is over.

The off-period is determined as a function of the possible code permutations of the selected code in such a way that it is practically impossible for a fraud to find the right code during the predetermined period of validity of the card, which eliminates the above-mentioned possibilities of fraudulence by a simple step of circuit technique, while on the other hand the intended period of validity of the card can be exploited to its full extent.

The timer according to the invention can also be used advantageously in such a way that a code that is correctly fed in allows for the operation of the identification element for a predetermined period. Thus the user is put in the position of being able to feed in a code, e.g. by means of a pocket terminal, even before the transaction itself, free from any disturbance from other persons. For the transaction itself made, for example, via a money-issuing automaton, the code input is then superfluous, so that the transaction is triggered within the predetermined period by the mere input of the identification element to the appropriate automaton. This makes it impossible for the code to be spied out by strangers.

The above-mentioned functions can be used alternatively or, when two timers are provided in the identification element, together.

Advantageous developments of the invention are the subject-matter of the subclaims.

BRIEF DESCRIPTION OF THE INVENTION

In the following embodiments of the invention are described in more detail with reference to the adjoined drawings.

These show:

FIG. 1 a block diagram with the timer provided according to the invention,

FIGS. 2, 3, 4 detailed embodiments of the timer in FIG. 1,

FIG. 5 a block diagram of an arrangement with two timers operated in a complementary mode of operation, and FIG. 6 a modified embodiment of the invention.

DESCRIPTION OF THE PREFERRED EMBODIMENT

Figure 1:
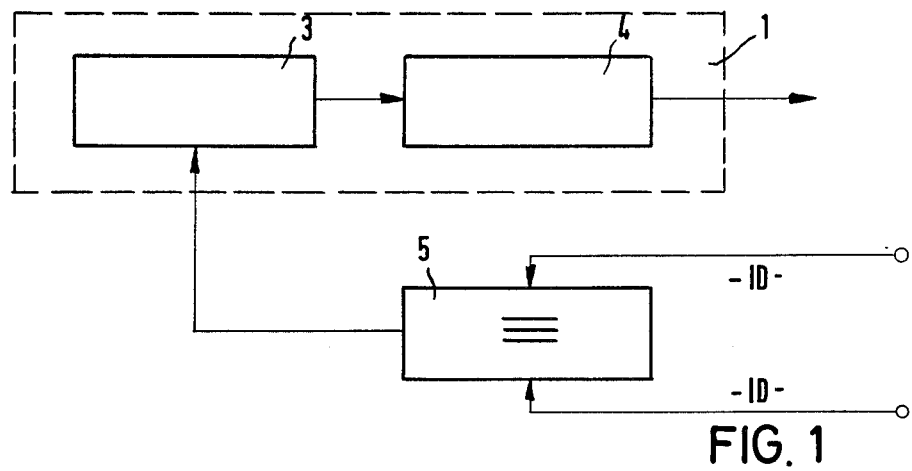

FIG. 1 shows by way of example the construction of a timer according to the invention in a schematized block diagram, as it can be contained in the integrated circuit of an identification element. The timer 1 shown consists of a charge element 3 in the form of a charge storage unit, and a control element 4. The charge element 3 is a condenser in the most simple case, which is charged whenever a signal is fed to it from a comparator 5. The comparator 5 compares for example the real identification code fed in via a keyboard with the nominal identification code stored in the identification element and produces an error signal when the character strings are not identical. The control element 4 connected with the charge element 3 produces an output signal when the condensator is charged, with which the communication with the identification element can be influenced for a predetermined period. This influence can take place, for example, in such a way that by aid of the output signal the data input line of the identification element is blocked so that it has no function for the predetermined period.

The timer 1 consisting of the elements 3 and 4 can be produced by the technology of integrated circuits, e.g. the MOS technique. However, the so-called "floating gate technique" can also be used, which is used for the production of non-volatile memories which are erasable with UV light or else electrically. The charge element 3 consists in this case of a FET transistor cell, in the control input of which an isolated charge island (floating gate) is integrated, whereby the switching threshold of the transistor is altered depending on the state of charge of the "island". In this way a charge element (storage cell), once it is charged and programmed, can be made to retain the charge and thus the logical state for several years. Since the discharge time is essentially determined by the type and thickness of the isolating layer surrounding the island, the discharge time can be varied by changing the parameters in such a way that it is adapted to the requirements on which the invention is based. In order to prevent unauthorized erasure of this type of charge element, appropriate steps must also be taken.

Thus a storage cell that is erasable by UV light can, for example, be covered with a material which absorbs UV radiation. The material covering the storage cell is arranged in such a way that if it is removed the cell is necessarily destroyed.

Figure 2:
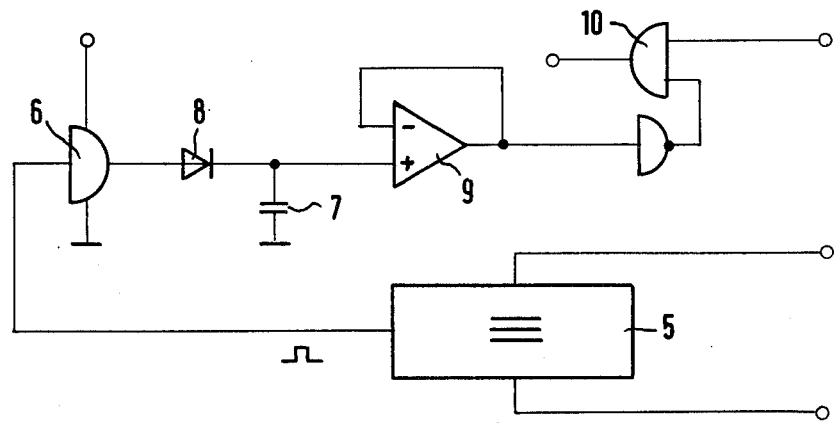

FIG. 2 shows a detailed embodiment of the invention. In this case the error pulse of the comparator 5 triggers a gate 6, of which the output almost rises to supply voltage and thereby recharges a condenser 7 via a diode 8. This condenser 7 is connected with an operational amplifier 9 acting as an impedance converter, having very high input resistence. The output signal of the operational amplifier 9 is used after inversion to block a data input gate 10.

In order to be able to find the right code a fraud must wait through the off-period until the identification element can take up new data for another code comparison. The off-period is set as a function of the possible code permutations in such a way that a fraud has practically no chance of finding the right code within the period of validity of the identification element. In this connection the following equation can be set up:

$$Te = \frac{N \cdot Ts}{60 \cdot 24 \cdot 360} \text{ (years)}$$

whereby Te is the decoding time (years), Ts the off-period (minutes) and N the code permutations. These parameters are selected according to the security requirements in such a way that the decoding time, for example, is a more or less large multiple of the period of validity of the identification element.

The off-period Ts is determined largely by the discharge constant of the timer. Since the discharge resistances concerned can be set very high, relatively long discharge periods can be obtained even in the case of condensers with a very small capacity. The effective off-period after the appearance of an error signal can thus be considerably prolonged when the switching threshold usual for logic modules is set accordingly low by aid of a comparator (not shown) connected to the impedance converter.

On the other hand, the recharging period is so small due to the small capacity of the condenser and the low recharging resistance which is essentially determined by the volume resistance of the diode 8, that a fraud has practically no chance of interrupting the process whose initiation he must at first recognize. The detection of this process is also difficult because the charging current must be isolated from the general supply current, which, however, is practically impossible because the supply current is also constantly subject to fluctuations of varying degree due to the processes that continually take place in the integrated circuit.

Figure 3:
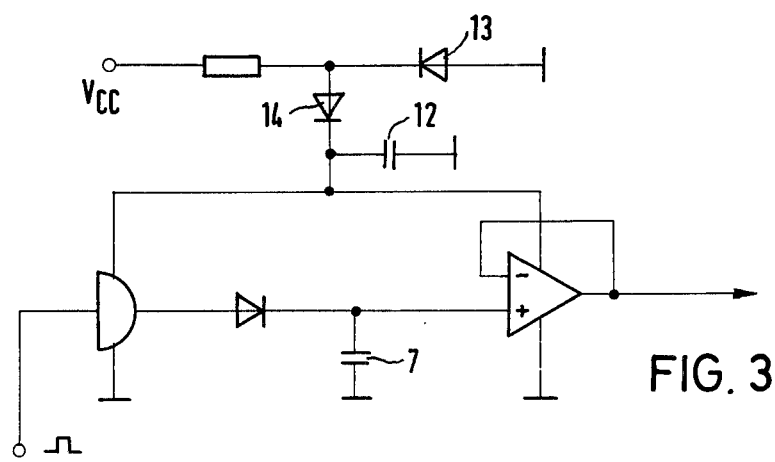

FIG. 3 shows a development of the timer shown in FIG. 2. The supply line of the circuit is here connected with the ground level of the circuit via another condenser 12 and a diode 13 switched in a non-conducting direction. This condenser 12 compensates the current impulse arising in the initial phase of the recharging of the condenser 7, which would theoretically be detectable with accordingly great effort in the circuit shown in FIG. 2. On the other hand, the diode 13 prevents a negative supply from influencing the behavior of the circuit, whereby the residual voltage left for the diode is compensated by aid of a diode 14.

Figure 4:
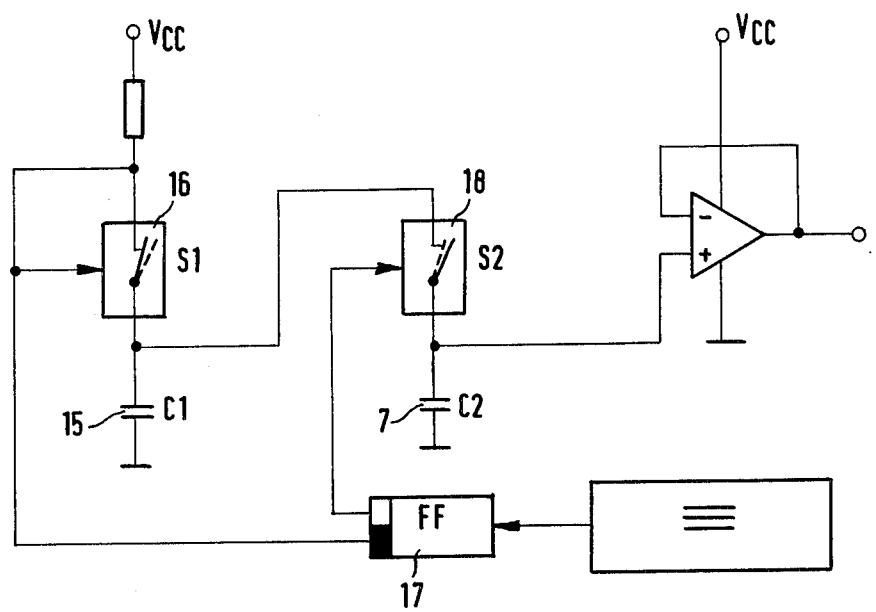

A further embodiment of the timer according to the invention is shown in FIG. 4. In this circuit an internal recharging process is initiated in the case of error, which has no effect on the externally accessible connecting leads of the identification element. In this case another condenser 15 is provided parallel to the condenser 7, which is recharged, when the supply current is applied to the identification element, via a switch 16 which is closed at this time. When the error impulse occurs a flip-flop 17 is set, with the output signals of which the switch 16 is opened and a switch 18 is closed, so that from this time on the condenser 7 is charged initiating the off-period. During the recharging and during the duration of the off-period the condensers 7, 15 are isolated from the supply line, so that neither the charging process nor the duration of the off-period can be affected. When the off-period is over the flip-flop 17 is reset, so that the former state is restored.

The timer according to the invention as in the embodiments in FIGS 2-4 can also be used to maintain the operability of the identification element for a predetermined period after a comparator output signal has occurred. A problem in the handling of the above-mentioned identification elements is that the code input is carried out at the money-issuing automaton and can thus in principle be spied out by strangers. This is especially true when the automata are set up in much-frequented places.

In this connection it has already been proposed to equip the identification element itself with a mechanical code input possibility which allows the user to set his personal code independently of the automata. The measure meets its purpose in principle, but requires relatively great technical resources and cannot be carried out well in the case of identification elements in the form of identification cards having predetermined dimensions. Furthermore, it proves to be disadvantage that the code, once it has been set, can be read on the identification element and is thus accessible to anyone.

These difficulties can be solved within the scope of the invention in question by using the above-described timer in such a way that a correctly fed in code allows for the operation of the identification element for a predetermined period. In this case a personal pocket terminal with the same design as the pocket calculators in use today can be used for the code input. This device can also be used to ascertain other data of the identification element, e.g. how one's account is at the moment. After inputting the correct code in a place remote from public money-issuing automata, the identification element can in this way be made to be operable for a predetermined period, whereby the operability can be made visually detectable by an appropriate signal on the pocket terminal. There is no more code input endangered by possibly being spied out at the public money-issuing automaton. The operability of the identification element is erased automatically after the transaction at the money-issuing automaton is over.

Figure 5:
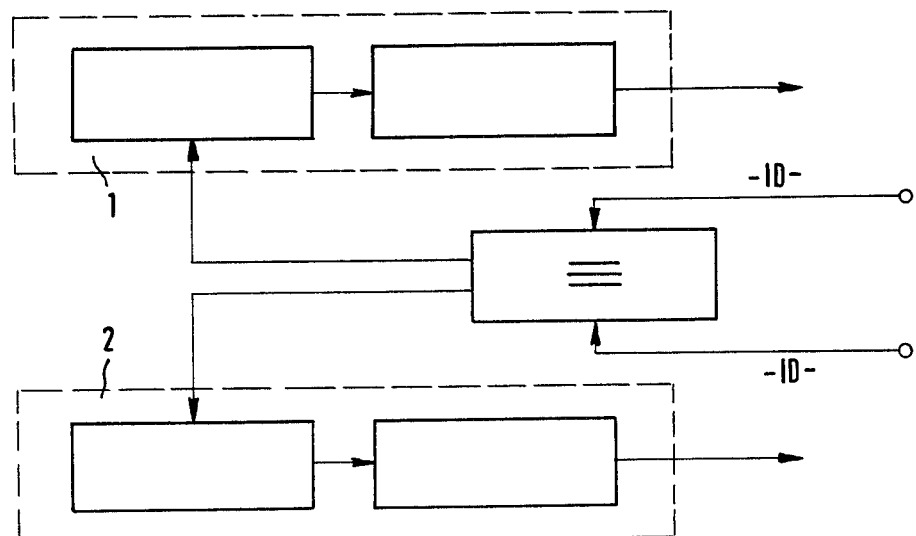

An advantageous combination of the two functions mentioned of the timer according to the invention is shown in FIG. 5. One timer each is activated in the way described above in detail when a yes-signal occurs and when a no-signal of the comparator occurs. In the case of a no-signal the timer 1 is triggered and the function of the identification element is blocked for a predetermined period. In the case of a yes-signal, on the other hand, a timer 2 is triggered, maintaining the operability of the identification element for a predetermined period.

Thus the same processes take place within the identification element independently of the output signal of the comparator. The fraud has therefore no chance of ascertaining or manipulating the blocking function of the identification element in any way because he can't draw any conclusions about the actual decision of the comparator from the changes in the operating data which possibly occur externally after a code input. On the other hand, the rightful owner can trigger the desired function at the automaton by simply inserting the card after a code input and without any further code input.

In the above-mentioned embodiments of the invention the identification element is blocked after every incorrect input for a predetermined period. In order to allow for corrections at the money-issuing automaton or the personal pocket terminal in spite of this, a key can be provided on each device with the help of which a code that has been incorrectly fed in by mistake is annulled before being definitively processed in the device.

Figure 6:
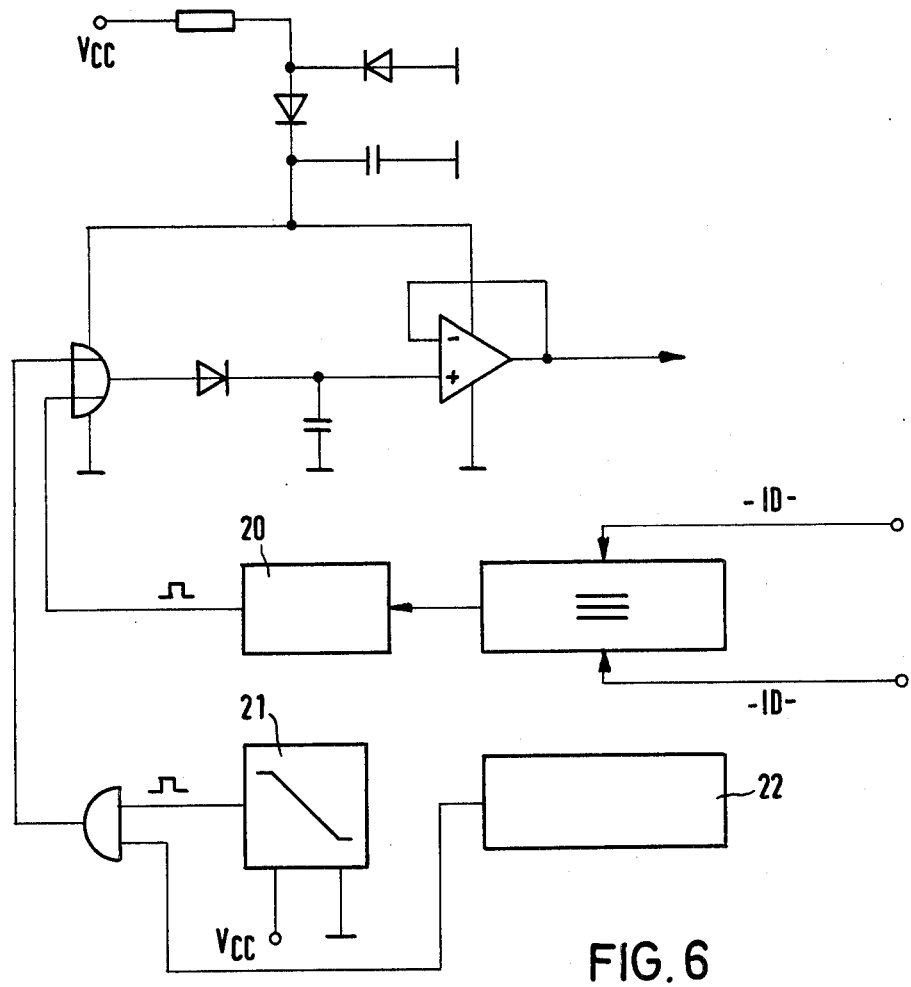

Another possibility of allowing for inadvertant incorrect inputs is shown in the embodiment of FIG. 6. In this case the blocking of the identification element takes place only after the second or third incorrect input which is detected by a counter 20. A threshold switch 21 is also provided which also blocks the identification element when the supply voltage falls below a predetermined value ensuring the function of the counter 20. In this way a fraud can be prevented from erasing the counter information by switching off the supply voltage before the counter information has reached the permissible number of errors and can thus trigger the blocking function. Finally, a control logic 22 is also provided which generates a release signal allowing an activation of the timer when the output signal of the threshold switch 21 is present. This release signal appears immediately after the identification element has been applied to the supply voltage at the beginning of the transaction, and disappears as soon as the right code has been fed in. In this way it is ensured that the identification element is not blocked after a proper transaction when the supply voltage is switched off.

What is claimed is:

1. An identification system for identifying cards and similar data carriers, containing along with general data an identification code which is compared at every use of the data carrier with a code that is fed into the system to effect generation of yes-or-no information, said system comprising a first timer (1) for blocking communication with the system for a predetermined period subsequent to the input of an incorrect code, a second timer (2) for enabling communication with the system for a second predetermined time period subsequent to the input of a correct code, said first and second timers being operated complementarily.

2. An identification system as in claim 1 wherein the timer (1, 2) consists of a charge element (3) and a control element.

3. An identification system as in claim 2, wherein the charge element (3) is a condenser produced in the technology of integrated circuits.

4. An identification system as in claim 2, wherein the charge element (3) is a storage cell produced by a floating technique.

5. An identification system as in claim 2 wherein the charge element (3) is covered with a UV-absorbant layer which, when removed, necessarily means the destruction of the element (3).

6. An identification system as in claim 2 wherein the control element is an operational amplifier (9) switched as an impedance converter, which gives a control signal depending on the charge of the charge element (7).

7. An identification system as in claim 2 wherein a diode (8) switched in the conducting direction is provided in the charging circuit of the charge element (7), which isolates the charge element (7) in a state of charge from the triggering arrangement (5, 6).

8. An identification system as in claim 2 wherein another charge element (12) is provided in the supply line of the timer (1, 2), which compensates the initial charging current of the charge element (7) affecting the control signal.

9. An identification system as in 8 wherein additional diodes (13, 14) are provided in the supply line of the timer (1, 2), which compensate the influence of a reversal of polarity of the supply voltage.

10. An identification system as in claim 2 wherein a resetable counter (20) is provided which triggers the first timer only after an error signal has occurred several times.

11. An identification system as in claim 2 wherein the system additionally has a threshold switch (21), which triggers the first timer (1) when the supply voltage falls below a predetermined value.

12. An identification system for use with data carriers, said system containing along with general data an identification code which is compared at every use of the data carrier with a code that is manually supplied to the system to effect yes-no information, wherein the identification system contains at least one activatable timer by means of which a communication with the system can be influenced for a predetermined time period subsequent to the input of a code, said timer consisting of a charge element and a control element, and including a second charge element that is connected in parallel with said charge element for affecting the control signal, said second charge element being rechargeable at every initial operation of the identification system and which in response to a controlled switch element, provides its charge to the charge element effecting the control signal when an error signal occurs.

13. An identification system as in claim 1, wherein inputting the code into the system is carried out by means of a pocket terminal.

14. An identification system as recited in claim 13, wherein said pocket terminal comprises display means for indicating the operability of the identification system.

* * * * *